(12) United States Patent  
Oury et al.

(10) Patent No.: US 12,420,674 B2  
(45) Date of Patent: Sep. 23, 2025

(54) THERMAL MANAGEMENT SYSTEM FOR A RECHARGEABLE BATTERY PACK ASSEMBLY

(71) Applicant: GM GLOBAL TECHNOLOGY OPERATIONS LLC, Detroit, MI (US)

(72) Inventors: Andrew P. Oury, Troy, MI (US); Roger M. Brisbane, Honeoye, NY (US); Goro Tamai, Bloomfield Hills, MI (US); Mohammed Bahauddin, Rochester Hills, MI (US); Galen E. Ressler, White Lake, MI (US); Calvin Goodman, Auburn Hills, MI (US); Giles D. Bryer, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 343 days.

(21) Appl. No.: 18/180,292

(22) Filed: Mar. 8, 2023

(65) Prior Publication Data

US 2024/0300381 A1    Sep. 12, 2024

(51) Int. Cl.
*B60L 58/26*    (2019.01)
*B60L 50/60*    (2019.01)
(Continued)

(52) U.S. Cl.
CPC ............... *B60L 58/26* (2019.02); *B60L 50/66* (2019.02); *H01M 10/613* (2015.04);
(Continued)

(58) Field of Classification Search
CPC ...... B60L 58/26; B60L 50/66; H01M 10/613; H01M 10/625; H01M 10/6568; H01M 2220/20
(Continued)

(56) References Cited

U.S. PATENT DOCUMENTS

| 8,286,743 | B2 * | 10/2012 | Rawlinson | .......... | H01M 50/242 |
|  |  |  |  |  | 180/68.5 |
| 8,663,824 | B1 * | 3/2014 | Frey | .................... | H01M 50/325 |
|  |  |  |  |  | 429/62 |

(Continued)

FOREIGN PATENT DOCUMENTS

| CN | 111162348 A | 5/2020 |
| DE | 102019134744 A1 | 6/2021 |

OTHER PUBLICATIONS

Thomas Barth, Status of NTSB Recommendations on Responder Safety in EV Battery Fires, 2021 AABC North America Conference, Dec. 8, 2021 San Diego CA USA.

(Continued)

*Primary Examiner* — Hau V Phan

(74) *Attorney, Agent, or Firm* — Quinn IP Law

(57) ABSTRACT

A thermal management system for a rechargeable battery pack assembly includes a conduit having an upstream end and a downstream end, the downstream end operatively connectable to an enclosure of the rechargeable battery pack assembly at a port of the rechargeable battery pack assembly. A sealing mechanism is configured to transition from a first state in which the sealing mechanism blocks flow of an applied stream of water through the conduit from the upstream end through the port, to a second state in which the sealing mechanism permits flow from the upstream end to the port and through the port into the interior cavity to cool the interior cavity.

20 Claims, 11 Drawing Sheets

(51) Int. Cl.
*H01M 10/613* (2014.01)
*H01M 10/625* (2014.01)
*H01M 10/6568* (2014.01)

(52) U.S. Cl.
CPC ..... *H01M 10/625* (2015.04); *H01M 10/6568* (2015.04); *H01M 2220/20* (2013.01)

(58) Field of Classification Search
USPC ........................................................ 180/68.1
See application file for complete search history.

(56) References Cited

U.S. PATENT DOCUMENTS

| | | | | |
|---|---|---|---|---|
| 8,679,659 | B2* | 3/2014 | Claypole | H01M 10/6569 429/50 |
| 9,105,951 | B2* | 8/2015 | Anderson-Straley | H01M 10/613 |
| 9,586,485 | B2* | 3/2017 | Badger | B60L 1/003 |
| 10,953,726 | B2* | 3/2021 | Carlson | H01M 10/6571 |
| 11,142,037 | B2* | 10/2021 | Kim | B60H 1/143 |
| 2022/0102780 | A1* | 3/2022 | Hickey | B60L 50/64 |
| 2022/0176773 | A1* | 6/2022 | Lee | B60H 1/00885 |
| 2022/0314743 | A1* | 10/2022 | Kim | B60H 1/00392 |
| 2022/0371404 | A1* | 11/2022 | Hasegawa | B60H 1/00899 |
| 2023/0291029 | A1* | 9/2023 | Cheng | H01M 10/643 |

OTHER PUBLICATIONS

C. Boulanger, J Thomaza, B Azmi, O Labadie, B Poutrain, M Gentilleau H Bazin, A partnership between renault and french first responders to ensure safe intervention on crash or fire-damaged electrical vehicles, Jun. 8, 2015, The 24th ESV conference proceedings (ESV2015), Goteborg, SE; https://www-esv.nhtsa.dot.gov/proceedings/24/files/24ESV-000252.PDF.

* cited by examiner

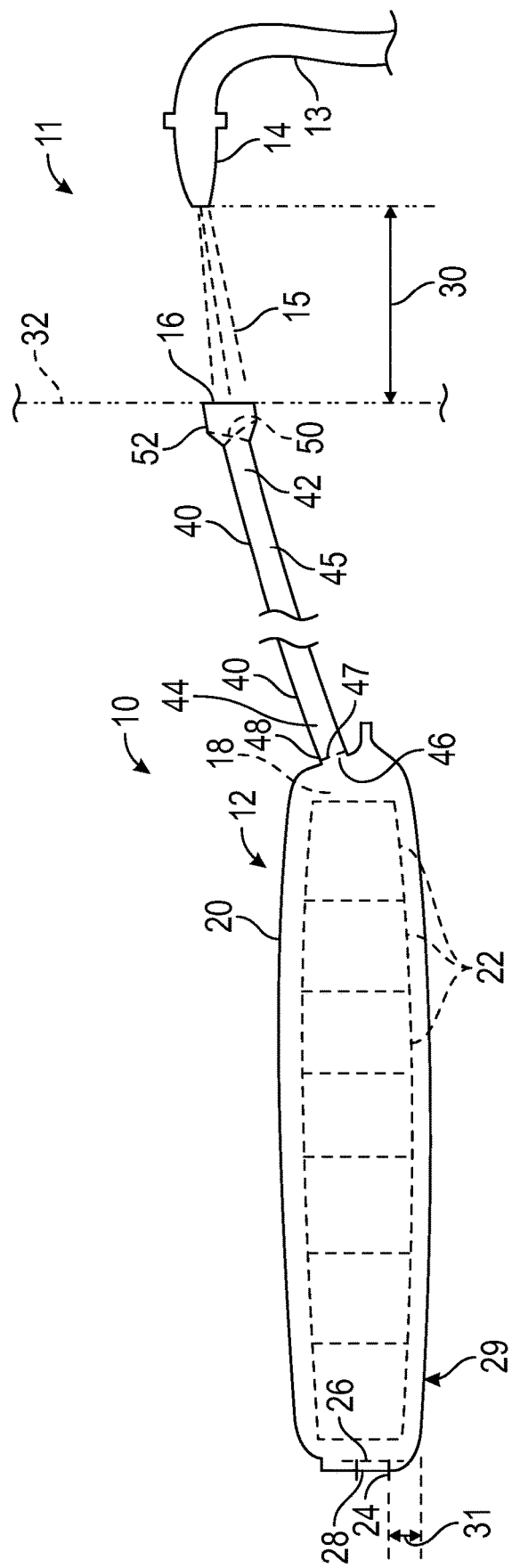

THERMAL MANAGEMENT SYSTEM FOR A RECHARGEABLE BATTERY PACK ASSEMBLY

INTRODUCTION

The present disclosure generally relates to a thermal management system for a rechargeable battery pack assembly. For example, the thermal management system may be included on a vehicle having the rechargeable battery pack assembly.

SUMMARY

A rechargeable battery pack assembly may have an enclosure containing rechargeable battery cells and other battery components. The enclosures may be configured to prevent water or water vapor infiltration in order to maintain optimal battery performance and longevity. In some implementations, the enclosures are hermetically sealed. Gas vents may sometimes be provided. The individual cells of a battery pack may generate a significant amount of heat during the pack's charge and discharge cycles. Cooling efforts are made to prevent a more accelerated heat-generating state called "thermal runaway", a condition in which the battery system cannot otherwise return the internal battery components to normal operating temperatures. In a sealed system, cooling efforts may include water quenching by the application of water applied to the exterior of the enclosure.

Disclosed herein are examples of thermal management systems that enable water to be directed to the interior of the battery system enclosure during quenching. In some examples, the thermal management system enables the ability to apply the water from a significant distance from the battery pack assembly. Features are provided that enable such internal quenching to occur without compromising the integrity of the battery pack enclosure. Although not limited to use on vehicles, the thermal management systems provided herein are especially beneficial for vehicle use as they include relatively few added components and low added mass.

In an example, the present disclosure provides a thermal management system for a rechargeable battery pack assembly that may include a conduit having an upstream end and a downstream end, the downstream end operatively connectable to an enclosure of the rechargeable battery pack assembly at a port of the rechargeable battery pack assembly. The conduit may be referred to as a fluid conduit. The thermal management system may include a sealing mechanism configured to transition from a first state in which the sealing mechanism blocks flow of an applied stream of water through the conduit from the upstream end through the port, to a second state in which the sealing mechanism permits flow of the water from the upstream end to the port and through the port into the interior cavity to cool the interior cavity. For example, battery components housed within the interior cavity may be quenched via the thermal management system.

The thermal management system may include a funnel disposed at the upstream end of the conduit and configured to direct the applied stream of water into the conduit. In an implementation, the sealing mechanism may be a spring-loaded check valve biased to the first state and that returns to the first state upon cessation of at least a predetermined pressure and/or flow rate of the applied stream of water. In another implementation, the sealing mechanism may be a membrane configured to rupture (e.g., burst) under a predetermined pressure and/or flow rate of the applied stream of water.

In an example, a screen may be disposed at or upstream of the port of the enclosure in order to further protect the interior cavity.

In some examples of the thermal management system, the enclosure may include a drain opening positioned so that the water is ejected from the enclosure after at least partially filling the interior cavity. By providing a drain opening and specifically positioning it to enable at least a partial filling of the interior cavity before drainage begins, a continuous stream of water through the interior cavity may optimize and quicken cooling of components in the interior cavity. Still further, to protect the interior cavity and the components therein, a membrane may be disposed across the drain opening and configured to rupture when the water at least partially fills the interior cavity. Additionally, a screen may be disposed across the drain opening.

In some examples, the rechargeable battery pack assembly may be incorporated in a vehicle for powering the vehicle, and the upstream end may be at an outer perimeter of the vehicle.

When implemented in a vehicle, the conduit may be at least partially defined by a body rail of the vehicle. In one example, the port of the enclosure includes at least partially aligned openings of a flange of the rechargeable battery pack assembly and the body rail. Alternatively, or in addition, a tube may at least partially define the conduit.

When implemented in a vehicle, the thermal management system may include a vehicle component removably secured over the upstream end at the outer perimeter of the vehicle. The vehicle component may be configured to prevent access to the upstream end when the vehicle component is secured to the vehicle, with access to the upstream end permitted when the vehicle component is removed from the vehicle. In another example, a vehicle grille may be disposed over the upstream end at the outer perimeter of the vehicle and may define at least one aperture through which the applied stream of water is directed into the upstream end of the conduit.

In still another example, when the thermal management system is implemented in a vehicle, the vehicle may include a charge port at the outer perimeter of the vehicle configured to receive an external charging device for recharging the rechargeable battery pack assembly. The thermal management system may include an access port adjacent to the charge port and operatively connected to the upstream end of the conduit.

In some implementations, the conduit may be configured so that, when the vehicle is disposed on a flat surface in an upright position, the conduit has an inclining portion and a declining portion. The inclining portion may be between the upstream end and the declining portion, and the declining portion may be between the inclining portion and the downstream end. Configuring the conduit with the inclining portion followed by the declining portion in the flow path may enable the conduit to be at least partially self-draining and may further protect the interior cavity from any intrusion other than during a quenching event.

In some implementations, a hose coupling is disposed at the upstream end of the conduit. The hose coupling may be configured to allow direct connection of the conduit with a hose that is connected to a water source providing the quenching water, for example.

A vehicle disclosed herein may include a vehicle body having an outer perimeter, and a rechargeable battery pack assembly disposed inward of the outer perimeter. The rechargeable battery pack assembly may include a sealed enclosure defining an interior cavity. The vehicle may include a thermal management system having a conduit with an upstream end and a downstream end. The downstream end may be operatively connectable to the sealed enclosure at a port of the sealed enclosure. The thermal management system may also include a sealing mechanism configured to transition from a first state in which the sealing mechanism blocks flow of an applied stream of water at the upstream end through the conduit from the upstream end through the port, to a second state in which the sealing mechanism permits flow from the upstream end to the port and through the port into the interior cavity to cool the interior cavity.

In some examples, the vehicle may include a vehicle component removably secured over the upstream end at the outer perimeter of the vehicle. The vehicle component may be configured to prevent access to the upstream end when the vehicle component is secured to the vehicle, with access to the upstream end permitted when the vehicle component is removed from the vehicle.

The conduit may have an inclining portion and a declining portion when the vehicle is disposed on a flat surface in an upright position. The inclining portion may be between the upstream end and the declining portion. The declining portion may be between the inclining portion and the downstream end.

A method of assembling a vehicle may include connecting a downstream end of a fluid conduit to a port of an enclosure of a rechargeable battery pack assembly, and positioning an upstream end of the fluid conduit at an outer perimeter of the vehicle.

The method may include securing a vehicle component over a funnel secured at the upstream end of the fluid conduit to at least partially block access to the funnel and the fluid conduit.

The above features and advantages and other features and advantages of the present disclosure are readily apparent from the following detailed description of the best modes for carrying out the disclosure when taken in connection with the accompanying drawings.

BRIEF DESCRIPTION OF THE DRAWINGS

The drawings described herein are for illustrative purposes only, are schematic in nature, and are intended to be exemplary rather than to limit the scope of the disclosure.

FIG. 1 is a side view illustration of a rechargeable battery pack assembly (RBPA) and a thermal management system for cooling components within an enclosure of the RBPA, and showing water applied from a nozzle at a distance.

FIG. 2 is a fragmentary cross-sectional illustration of a portion of an implementation of the thermal management system of FIG. 1 showing a funnel at an upstream end of a conduit and with a sealing mechanism configured as a spring-biased check valve in a first, closed state sealing the conduit.

DETAILED DESCRIPTION

Figure 3:
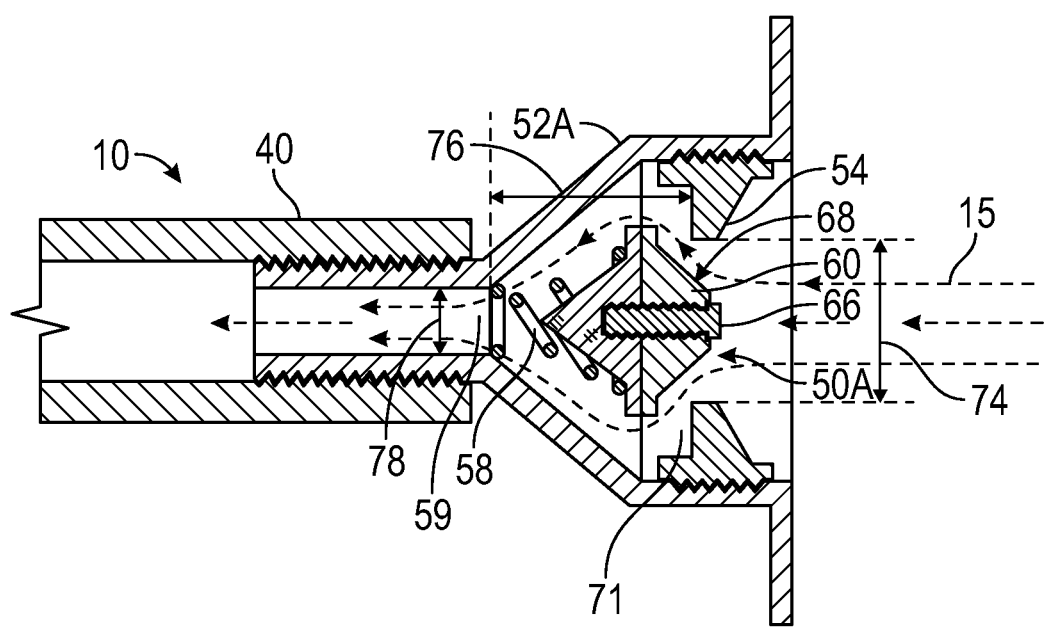
FIG. 3 is a fragmentary cross-sectional illustration of the portion of the thermal management system of FIG. 2 with the spring-biased check valve moved to a second, open state by an applied stream of water.

Referring to the drawings, wherein like reference numbers refer to like components throughout the views, various examples of thermal managements systems for rechargeable battery pack assemblies are shown. The rechargeable battery pack assemblies described herein are configured with an enclosure defining an interior cavity containing rechargeable battery cells and other battery components. The enclosure is configured to prevent water or water vapor infiltration into the interior cavity during normal use in order to maintain optimal battery performance and longevity. The thermal management systems described herein adapt such rechargeable battery pack assemblies to permit water to enter the interior cavity of the enclosure to quench the components therein under a rare occurrence of a thermal runaway event.

FIG. 1 shows a thermal management system 10 for a rechargeable battery pack assembly 12 (also referred to herein as a RBPA 12) during a cooling event in which a hose 13 with a water nozzle 14 applies water 15 into an inlet opening 16 of the thermal management system 10, so that water may enter into a normally sealed interior cavity 18 of a battery pack enclosure 20 in which internal components 22 such as battery cells are housed. The water 15 will at least partially fill the interior cavity 18 to dispel heat.

A drain opening 24 may be provided, and a rupturable membrane 26 (such as a burst disk) and a screen 28 may span the drain opening 24. The drain opening 24 enables a continuous stream of the water 15 to move through the interior cavity 18 in order to maximize cooling. The drain opening 24 is positioned so that the water 15 is not ejected from the enclosure 20 (e.g., spills out of the enclosure) until after at least partially filling the interior cavity 18. For example, the drain opening 24 is spaced apart from a bottom surface 29 of the RBPA 12 by a predetermined amount 31, which is a height above the bottom surface 29 when the RBPA 12 is in a level position as shown in FIG. 1.

The thermal management system 10 is configured so that the water 15 may be applied either with the nozzle 14 positioned directly at the inlet opening 16 or with the nozzle 14 at a distance 30 from the inlet opening 16, as shown. If the nozzle 14 is placed directly at the opening 16, in some implementations, the nozzle 14 may be on an extension of the hose 13 that allows a hose handler to remain a distance from the outer perimeter 32. The inlet opening 16 is disposed at an outer perimeter 32 of the application 11 in which the RBPA 12 is implemented, including automotive and nonautomotive applications, such as but not limited to for powering a passenger or commercial vehicle, or in a laboratory. These and other features are described in greater detail with respect to various examples herein.

As used herein, the terms "vehicle" and "motor vehicle" may be used interchangeably and synonymously to include any relevant vehicle platform, such as passenger vehicles (hybrid electric vehicle, fully electric vehicle, fully and partially autonomous, etc.), commercial vehicles, industrial vehicles, tracked vehicles, off-road and all-terrain vehicles, motorcycles, farm equipment, e-scooters, e-bikes, trains, watercraft, aircraft, etc. For non-automotive applications, disclosed concepts may be implemented for any logically relevant use, including laboratories, stand-alone power stations, portable power packs, etc. While not per se limited to such, disclosed concepts may be used with lithium-ion traction battery packs, for example.

Referring again to FIG. 1, the thermal management system 10 includes a conduit 40 having an upstream end 42 and a downstream end 44. The conduit 40 is substantially hollow, defining an internal passage 45 extending through the conduit 40 from the upstream end 42 to the downstream end 44. In some examples, at least a portion of the conduit 40 may be a tube. In other examples discussed herein, at least a portion of the conduit 40 may be a body rail or other structure of a vehicle that defines the passage 45.

The downstream end 44 of the conduit 40 is operatively connectable to the sealed enclosure 20 at a port 46 of the sealed enclosure 20. For example, the downstream end 44 and the port 46 may connect at a threaded interface 48, such as at internal threads of the port 46 and external threads of the conduit 40 at the downstream end 44, or external threads of the port 46, internal threads of the conduit 40, or by another sealed connection, such as a slip clamp. In some examples, a screen 47 may be disposed at or upstream of the port 46 to permit flow of the applied water to the port but otherwise help to prevent access to the interior cavity 18 through the port 46.

A sealing mechanism 50 is shown schematically at the upstream end 42 and, more specifically, within a funnel 52 disposed at the upstream end 42. The funnel 52 is configured to direct the applied stream of water 15 into the conduit 40.

Although shown at the upstream end 42, in various examples, the sealing mechanism 50 could be anywhere at or between the inlet opening 16 of the thermal management system 10 (shown here as the inlet opening of the funnel 52) and the port 46. Advantages to placing the sealing mechanism 50 near the upstream end 42 include ease of access for assembly and replacement.

As discussed herein, when subjected to the applied stream of water 15, the sealing mechanism 50 is configured to transition from a first state in which the sealing mechanism 50 blocks flow through the conduit 40 from the upstream end 42 and through the port 46 into the interior cavity 18, to a second state in which the sealing mechanism 50 permits water flow from the upstream end 42, to and through the port 46 and into the interior cavity, enabling the water 15 to cool the components 22 by dispelling heat from the interior cavity 18 of the sealed enclosure 20. The sealing mechanism 50 is configured so that the second state does not occur unless the applied water 15 at the upstream end 42 has at least a predetermined pressure and flow rate. Various examples of suitable sealing mechanisms are discussed herein.

The thermal managements system 10 may be configured such that, with a flow rate of 250 gallons per minute and pressure of 50 pounds per square inch, the distance 30 from which the water 15 is applied may be significant, such as 20 feet. In any event, such a flow rate and pressure is provided by at least some hoses and nozzles, such as those used in the public sector, and the system 10 requires no customized tools or parts to adapt for use with such hoses and nozzles.

FIG. 2 is a fragmentary cross-sectional illustration of a portion of the thermal management system 10 of FIG. 1 showing one example of a funnel 52A that may be used as the funnel 52 at the upstream end 42 of the conduit 40 and with one example of a sealing mechanism 50A that may be used as the sealing mechanism 50 in FIG. 1. The sealing mechanism 50A is configured as a spring-biased check valve and may be referred to as such. The spring-biased check valve 50A is shown in a first, closed state sealing the passage 45 of the conduit 40.

More particularly, the sealing mechanism 50A includes an externally-threaded valve seat 54 including external threads 55 threaded to internal threads 56 of the funnel 52A. The interfacing threads 55, 56 allow adjustment of the valve seat 54 between the inlet opening 16 and an outlet end 59 of the funnel 52A as discussed herein. In other examples, the valve seat 54 may be secured within the funnel 52A without interfacing threads in a fixed location and without the possibility of positional adjustment of the valve seat 54 within the funnel 52A.

The sealing mechanism 50A includes a biasing member such as a coil spring 58, and a valve body 60 biased against the valve seat 54 by the coil spring 58. The coil spring 58 is depicted as a conical compression spring 58 but is not limited to such. The valve body 60 includes a pintle 62 that interfaces with the seat 54 in the first, closed state, and a guide 64 secured to the pintle 62 with a threaded screw 66 or otherwise. The guide 64 interfaces with the coil spring 58.

FIG. 3 is a fragmentary cross-sectional illustration of the portion of the thermal management system 10 of FIG. 2 with the spring-biased check valve 50A moved to a second, open state by an applied stream of water 15, such as from the nozzle 14 of FIG. 1. Pressure from the water 15 on the exposed surface area 68 of the pintle 62 overcomes the biasing force of the spring 58, compressing the spring 58 and moving the valve body 60 away from the valve seat 54. The water 15 is thus able to pass between the valve seat 54 and the valve body 60 and through the funnel 52A into the conduit 40.

Figure 4:
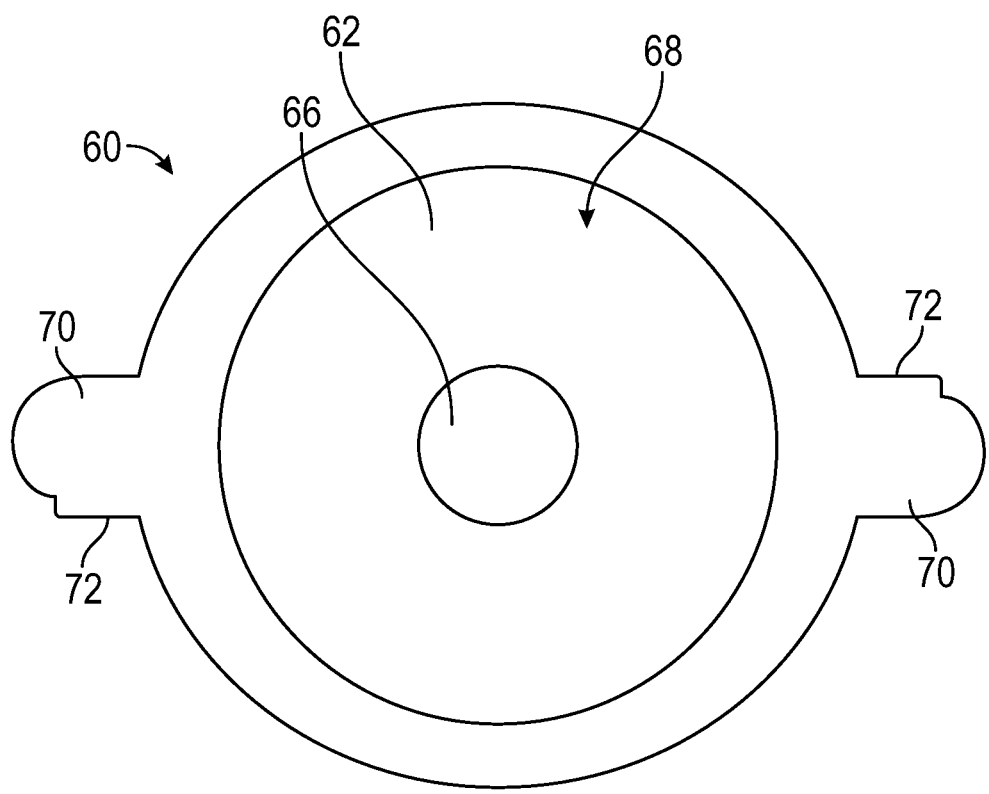
FIG. 4 is a plan view of a pintle of the spring-biased check valve of FIGS. 2-3 showing anti-rotation features.

FIG. 4 is a plan view of the valve body 60 of the spring-biased check valve 50A. As shown, the valve body 60 includes anti-rotation features 70 configured as outwardly-extending, opposed arms each having a flat side 72. The flat sides 72 may interface with shoulders of the valve seat 54 (not shown but extending toward the outlet end 59) to limit rotation of the valve body 60 in a counter-clockwise direction, for example.

The geometry of the funnel 52A and the spring-biased check valve 50A may be specifically configured to maintain the first, closed state in the absence of at least a predetermined flow rate and pressure of the water 15, to open the spring-biased check valve 50A when the water applied is at or above the predetermined flow rate and pressure, such as but not limited to 250 gallons per minute and 50 pounds per square inch, and to return the spring-biased check valve 50A to the first, closed state when the pressure and flow rate falls below the predetermined levels, such as when application of the water 15 ceases. Because the spring-biased check valve 50A closes when the applied water drops below the predetermined flow rate and/or pressure, access to the components 22 through the funnel 52A and conduit 40 is prevented.

In one example, the spring 58 may have an inner diameter of about 1.0 inch at an end biased against the outlet end 59 of the funnel 52, an inner diameter of about 2.0 inches at the end biased against the valve body 60, may be about 2.0 inches long in an uncompressed state and about 0.78 inches in a maximum compressed state, and may have a wire diameter of about 0.1 inches. The material of the spring 58 may be selected to provide a spring stiffness enabling opening to the second state under at least the predetermined water pressure and flow rate applied to the surface area 68 of the valve body 60 to allow flow through the funnel 52A.

Additionally, the geometry of the funnel 52A and the adjustable position of the valve body 60 via the threaded engagement at threads 55, 56 may be selected to provide a flow area at the clearance 71 and through the funnel 52A that reduces resistance to flow once the valve body 60 is moved to the second state. For example, in one example, the diameter 74 of the opening of the valve seat 54 may be equal to a distance 76 from the outlet end 59 of the funnel 52A (against which the spring 58 is biased) when the valve body 60 is positioned at a furthest position from the end 59. The threads 55, 56 may allow adjustment of the first, closed position of the valve body 60 from the furthest position toward the end 59 by about one quarter to one third of the distance 76. For example, if the distance is 55 millimeters, the threads 55, 56 may allow adjustment by 15 millimeters so that the closed position of the valve body 60 is 40 millimeters from the end 59. Such dimensions may provide sufficient flow to the interior cavity 18 from a nozzle 14 having a flow opening diameter of about 12.5 millimeters and with an internal diameter 78 of the funnel 52A at the end 59 of about 0.8 inches.

Figure 5:
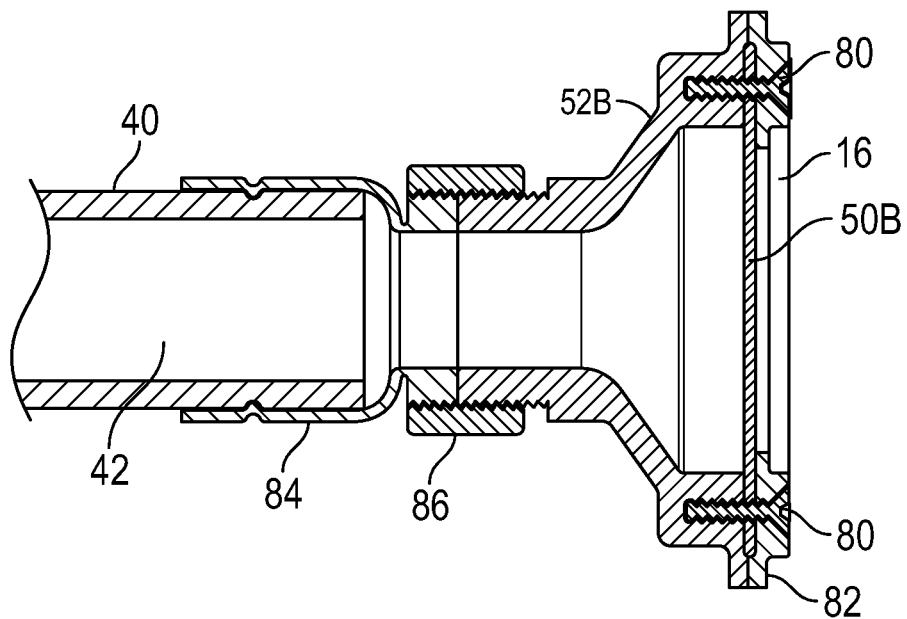
FIG. 5 is a fragmentary cross-sectional illustration of a portion of an implementation of the thermal management system of FIG. 1 showing a funnel at an upstream end of a conduit and with a sealing mechanism configured as a membrane in a first state sealing the funnel and conduit.

With reference to FIG. 5, another example of a sealing mechanism 50B and funnel 52B that may be used as the sealing mechanism 50 and funnel 52 of FIG. 1 are shown. The sealing mechanism 50B is a membrane and may be referred to as such. The membrane 50B has a first state, shown in FIG. 5 in which the membrane 50B spans the opening 16 of the funnel 52B to prevent water entry. In an example, the diaphragm material may comprise polytetrafluoroethylene (PTFE) such as SAE AMS3678/7 PTFE.

The membrane 50B may be secured to the funnel 52B with screws 80 that extend through an annular plate 82 and into the funnel 52B. The funnel 52B in turn is secured to a sleeve 84 crimped onto the end of the conduit 40 via an internally-threaded collar 86 that threads to external threads of the funnel 52B and the sleeve 84.

Figure 6:
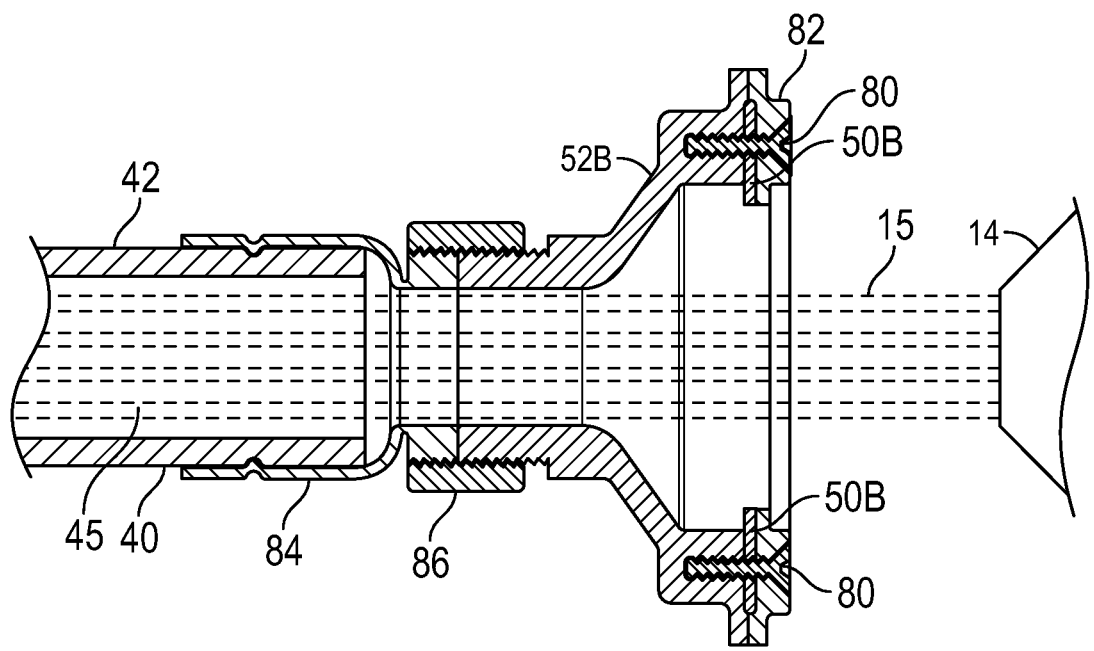
FIG. 6 is a fragmentary cross-sectional illustration of the portion of the thermal management system of FIG. 5 with the membrane in a second, ruptured state permitting flow of an applied stream of water into the funnel and conduit.

The membrane 50B is configured to rupture under the predetermined pressure and flow rate of the applied stream of water 15 to adopt a second state, shown in FIG. 6, in which the applied water 15 is permitted to enter the conduit 40 through the funnel 52B. In the second state, the membrane 50B is ruptured, and a majority of the membrane 50B may be torn away, leaving portions secured to the funnel 52B at screws 80.

Figure 7:
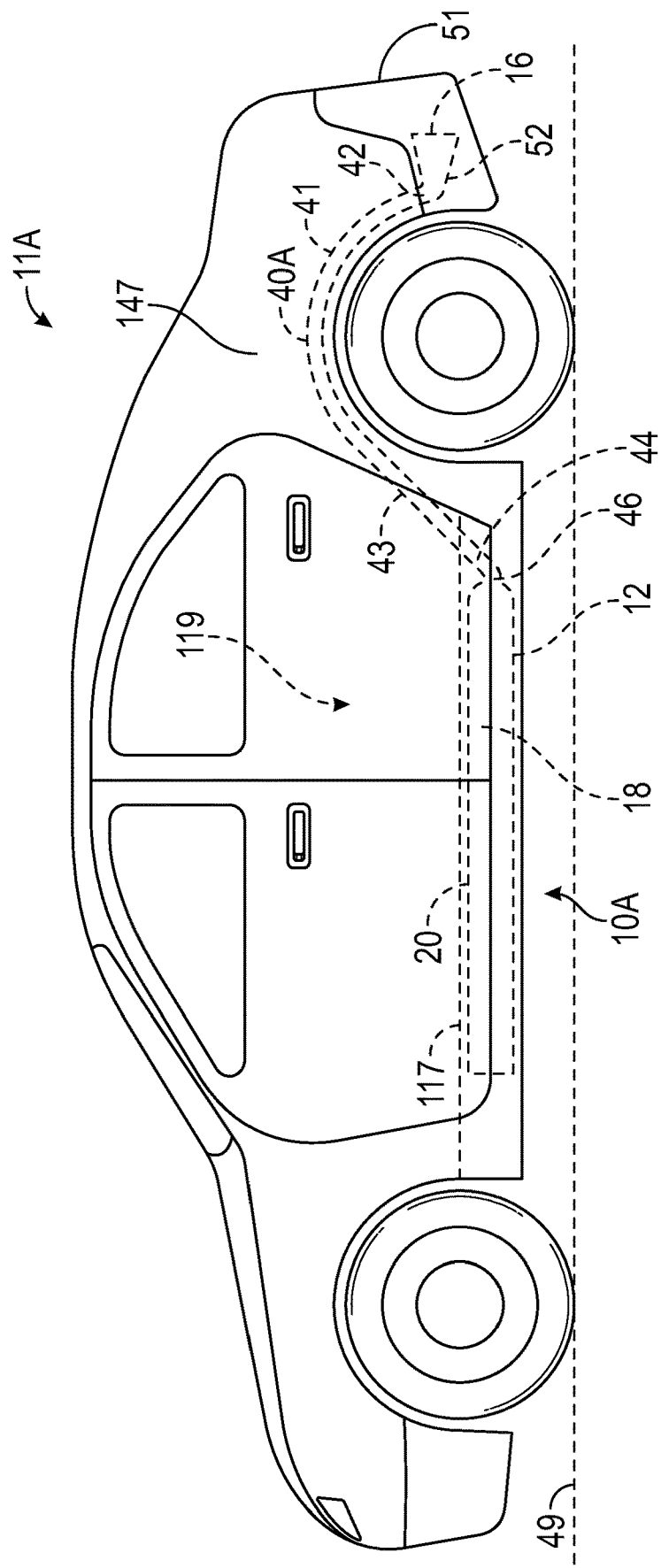
FIG. 7 is a side view illustration of a vehicle having an example of a thermal management system.

FIG. 7 shows one implementation of the thermal management system 10 and application 11 of FIG. 1 represented as a thermal management system 10A and vehicle 11A. The application is an automotive vehicle and may be referred to as such. The RBPA 12 is incorporated into the vehicle 11A for powering the vehicle 11A. For example, the RBPA 12 is shown mounted under a floor 117 of a passenger compartment 119 of the vehicle 11A. It should be appreciated, however, that the RBPA 12 could be mounted elsewhere in or on the vehicle 11A. The internal components 22 are in the interior cavity 18, as in FIG. 1, but are not depicted in FIG. 7 for simplicity in the drawing.

The thermal management system 10A includes a conduit 40A disposed between the port 46 and the funnel 52. The downstream end 44 of the conduit 40A is operatively connectable to the sealed enclosure 20 at the port 46. The conduit 40A functions as described with respect to conduit 40 and may be configured as a flexible tube. As shown, the conduit 40A has an inclining portion 41 and a declining portion 43 when the vehicle 11A is disposed on a flat surface 49 in an upright position as shown in FIG. 7. The inclining portion 41 inclines between the upstream end 42 and the declining portion 43 such as but not limited to from the upstream end 42 to a peak of the conduit 40A between the inclining portion 41 and the declining portion 43. The declining portion 43 declines between the inclining portion 41 and the downstream end 44 such as but not limited to from the peak at the inclining portion 41 to the downstream end 44. The conduit 40A may be a flexible tube that is secured to body structure such as cross-members of the vehicle 11A in multiple places, with brackets or otherwise, inward of a rear quarter panel 147. Alternatively or in addition, the conduit 40A may be formed at least partially by body structure as a passage through the body structure.

Figure 8:
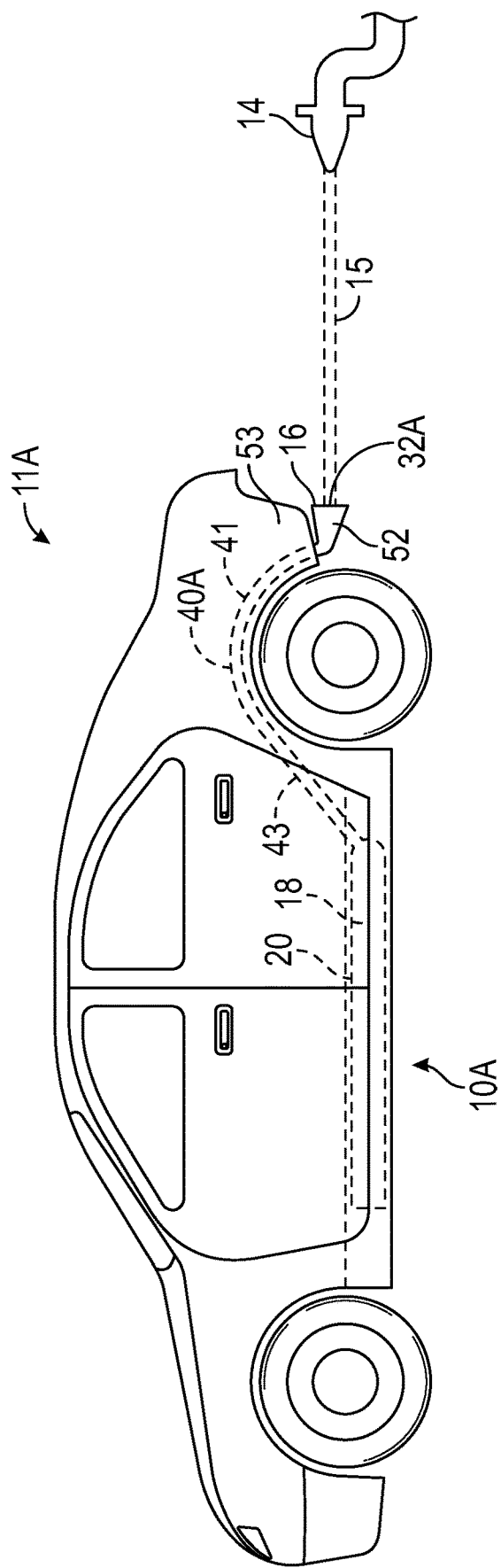
FIG. 8 is a side view illustration of the vehicle of FIG. 7 with a rear bumper fascia removed to expose a funnel at the upstream end of a conduit of the thermal management system of FIG. 7 to permit access to the conduit by water shown applied from a nozzle at a distance.

As shown in FIG. 7, a vehicle component such as a rear bumper fascia 51 is removably secured to other vehicle structure, such as the rear quarter panel 147 and/or a rear bumper 53 (see FIG. 8). As used in this instance, "removably secured" means that the rear bumper fascia 51 remains secured on the vehicle 11A during operation until forcibly removed, which may entail damage to the rear bumper fascia 51. The rear bumper fascia 51 covers the funnel 52 and the inlet opening 16 of the funnel 52 when the rear bumper fascia 51 is secured in its normal position on the vehicle 11A, preventing access to the funnel 52 and the upstream end 42 of the conduit 40A. When cooling of the interior cavity 18 is needed, the rear bumper fascia 51 may be removed, as shown in FIG. 8, to expose the inlet opening 16 of the funnel 52. With the rear bumper fascia 51 removed, the inlet opening 16 is at and establishes part of the outer perimeter 32A of the vehicle 11A. For example, a person or a robotic arm may forcibly remove the rear bumper fascia 51 by direct manipulation, or by indirect manipulation, such as with extended tools that allow removal at a distance from the perimeter 32A such as from the distance 30 in FIG. 1.

With the rear bumper fascia 51 removed, the funnel 52 is exposed and serves as a target for the water 15 applied by the nozzle 14, as shown in FIG. 8. Stated differently, access is permitted to the funnel 52 and the upstream end 42. By keeping the funnel 52 hidden beneath the rear bumper fascia 51 until quenching is undertaken, unintentional manipulation and use of the thermal management system 10 is minimized. Covering access to the funnel 52 with the rear bumper fascia 51 unless a rare need for quenching of the internal components 32 arises maintains system integrity.

The predetermined pressure discussed herein is sufficient such that the applied water 15 can travel uphill from the funnel 52 through the inclining portion 41 in the vehicle 11A before flowing downhill through the declining portion 43. Additionally, the initial inclining portion 41 provides the ability for the system 10A to drain water toward the biasing mechanism 50 after the application of water ceases and, if the biasing mechanism 50 is not a reclosing biasing valve 50A, then also out of the conduit 40A through the funnel 52. For example, when application of the water 15 is stopped, at least some water trapped in the conduit 40A at the initial inclining portion 41 may drain out of the funnel 52. Additionally, the inclining portion 41 makes it difficult for water, other fluids, materials, or objects to be applied into the interior cavity 18 without at least having a requisite momentum to overcome gravity to move through the inclining portion 41.

Figure 9:
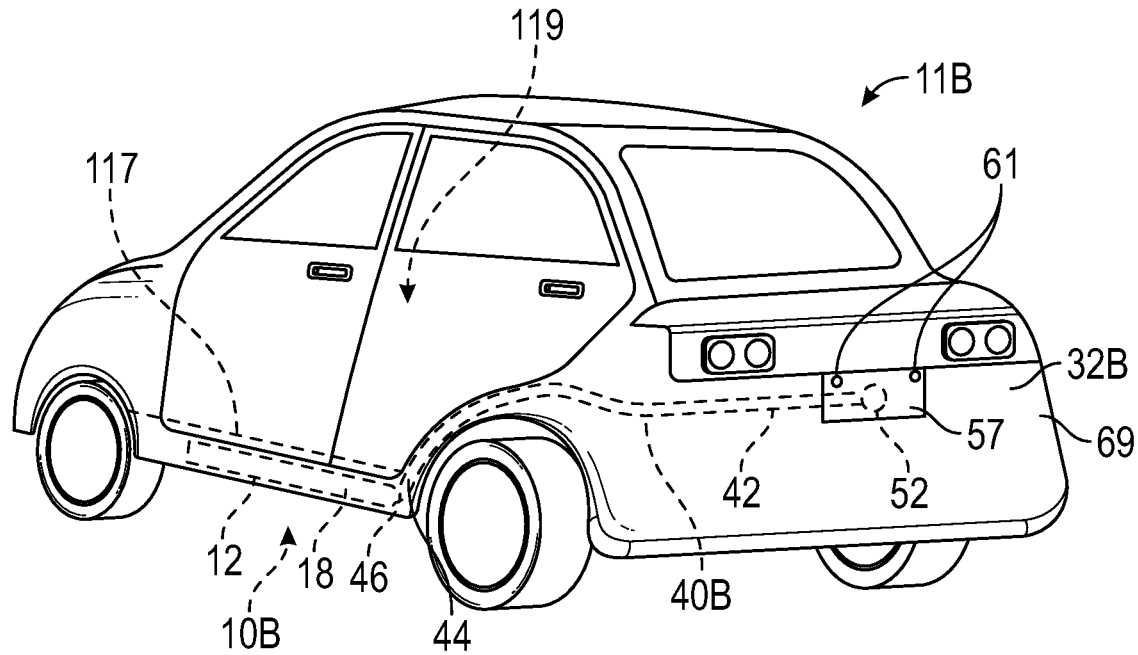
FIG. 9 is a rear perspective view of a vehicle having another example of a thermal management system.
Figure 10:
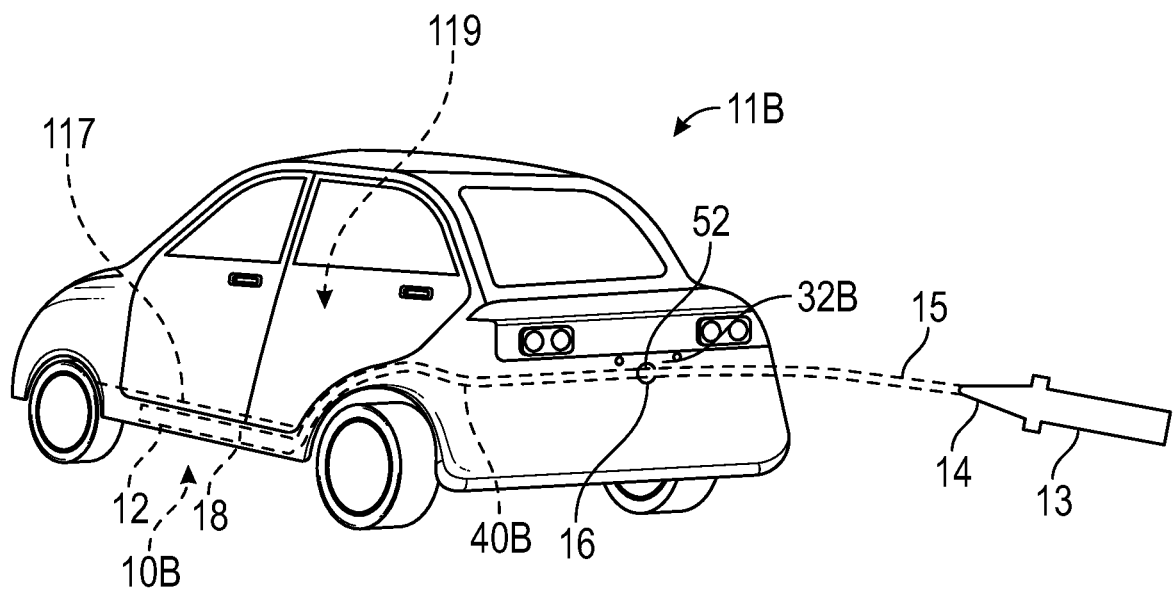
FIG. 10 is a rear perspective view of the vehicle of FIG. 9 with a license plate removed to expose a funnel at the upstream end of a conduit of the thermal management system of FIG. 9 to permit access to the conduit by water shown applied from a nozzle at a distance.

FIGS. 9-10 show another implementation of the thermal management system 10 and application 11 of FIG. 1 represented as a thermal management system 10B and vehicle 11B. The application is an automotive vehicle and may be referred to as such. The RBPA 12 is incorporated into the vehicle 11B for powering the vehicle 11B. For example, the RBPA 12 is shown mounted under a floor 117 of a passenger compartment 119 of the vehicle 11B. It should be appreciated, however, that the RBPA 12 could be mounted elsewhere in or on the vehicle 11B. The internal components 22 are in the interior cavity 18, as in FIG. 1, but are not depicted in FIGS. 9-10 for simplicity in the drawings.

Similar to the thermal management system 10A, the thermal management system 10B includes a conduit 40B and a vehicle component removably secured over a funnel 52 at the upstream end 42 of the conduit 40B and at an outer perimeter 32B of the vehicle 11B. In this implementation, the vehicle component is a license plate 57 secured to rear body structure 69 of the vehicle 11B with bolts 61 or otherwise. The conduit 40B extends from the port 46 to the funnel 52, attaching to vehicle body structure with brackets or the like or being formed at least partially by the vehicle body structure as a passage through the body structure, such as a passage defined by a body rail.

The license plate 57 remains secured on the vehicle 11B during operation until removed. The license plate 57 covers the funnel 52 and the inlet opening 16 of the funnel 52 when the license plate 57 is secured in its normal position on the vehicle 11B, preventing access to the funnel 52 and the upstream end 42 of the conduit 40B. When cooling of the interior cavity 18 is needed, the license plate 57 may be removed, as shown in FIG. 10, to expose the inlet opening 16 of the funnel 52. With the license plate 57 removed, the inlet opening 16 is at and establishes a portion of the outer perimeter 32B of the vehicle 11B. For example, a person or a robotic arm may remove the rear bumper fascia 51 by direct manipulation of the bolts 61, or forcibly by tearing off the license plate 57, or by indirect manipulation, such as with extended tools that allow removal at a distance from the perimeter 32B such as distance 30 in FIG. 1. FIG. 10 shows water 15 applied from a nozzle 14 at a distance from perimeter 32B, so that the water enters the funnel 52 and is routed through the conduit 40B to the interior cavity 18.

Figure 11:
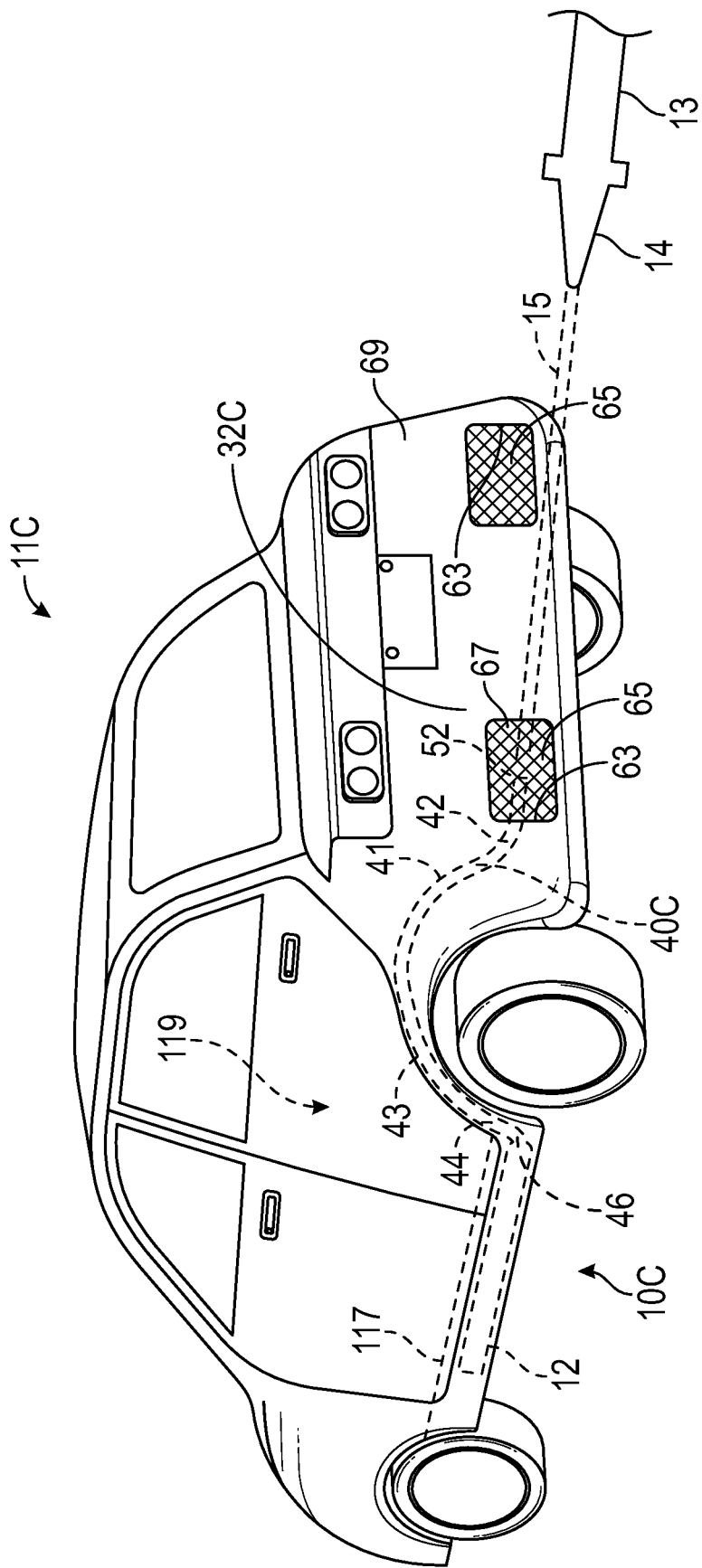
FIG. 11 is a rear perspective view of a vehicle having another example of a thermal management system including a grille disposed over a funnel at an upstream end of a conduit to permit access to the conduit by water shown applied through the grille from a nozzle at a distance.

FIG. 11 shows another example of another implementation of the thermal management system 10 and application 11 of FIG. 1 represented as a thermal management system 10C and vehicle 11C. The application is an automotive vehicle and may be referred to as such. The RBPA 12 is incorporated into the vehicle 11C for powering the vehicle 11C. For example, the RBPA 12 is shown mounted under a floor 117 of a passenger compartment 119 of the vehicle 11C. It should be appreciated, however, that the RBPA 12 could be mounted elsewhere in or on the vehicle 11C. The internal components 22 are in the interior cavity 18, as in FIG. 1, but are not depicted in FIG. 11 for simplicity in the drawing.

The rear body structure 69 of the vehicle 11C includes an opening 63 covered by a screen at an outer perimeter 32C of the vehicle. In the example shown, the screen is a grille 65, such as a decorative grille. The grille 65 is supported by the rear body structure 69 and extends across the opening 63. In the example shown, there are two spaced openings 63 each having a grille 65 extending thereacross.

The thermal management system 10C includes a conduit 40C similar to conduit 40A in that it has an inclining portion 41 and a declining portion 43. The funnel 52 is attached at the upstream end 42 of the conduit 40C and is disposed just inward of the grille 65 and aligned with the opening 63. The grille 65 defines a plurality of apertures 67. Accordingly, water 15 may be applied from the nozzle 14 through the apertures 67 in the grille 65 into the funnel 52 and the upstream end 42 with the nozzle 14 spaced a distance from the grille 65, such as the distance 30 indicated in FIG. 1. The grille 65 thus serves the function of partially hiding and restricting access to the funnel 52, at least insofar as solid objects larger than the apertures 67 in the grille 65 will not fit into the funnel 52 through the grille 65. Additionally, unlike vehicle components that need to be removed to provide access to the funnel 52, such as the rear bumper fascia 51 of FIG. 7 and the license plate 57 of FIG. 9, no removal step is needed as the funnel 52 is accessed through the grille 65 with the grille 65 remaining in place.

Figure 12:
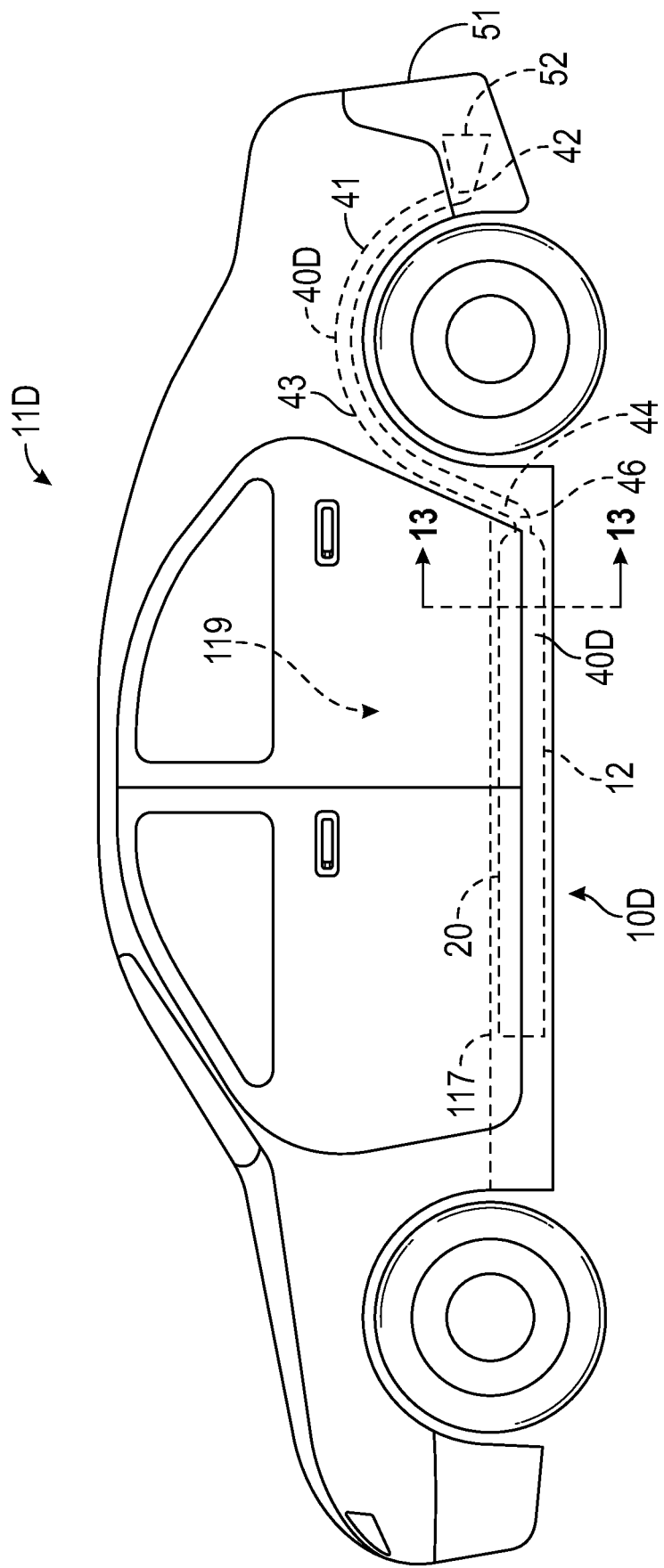
FIG. 12 is a side view illustration of a vehicle having another example of a thermal management system.

FIG. 12 shows another implementation of the thermal management system 10 and application 11 of FIG. 1 represented as a thermal management system 10D and vehicle 11D. The application is an automotive vehicle and may be referred to as such. The RBPA 12 is incorporated into the vehicle 11D for powering the vehicle 11D. For example, the RBPA 12 is shown mounted under a floor 117 of a passenger compartment 119 of the vehicle 11D. It should be appreciated, however, that the RBPA 12 could be mounted elsewhere in or on the vehicle 11D.

The thermal management system 10D is the same as thermal management system 10A except that a conduit having an upstream end 42 at an outlet of the funnel 52 and a downstream end 44 at the port 46 is at least partially defined by a body rail 40D of the vehicle 11D rather than by a tube. Stated differently, the body rail 40D forms an internal passage 45 utilized as the conduit. For example, the body rail 40D that forms the conduit with the passage 45 is shown as a lower portion of a door ring. Inner and outer door panels 98, 99 are shown in a door closed position, with the inner door panel 98 abutting the body rail 40D. The port 46 includes at least partially aligned openings of a flange 75 of the enclosure 20 and the body rail 40D. For example, with reference to FIG. 13, the body rail 40D has an opening 77 extending through a bottom wall of the body rail 40D, and the flange 75 has an opening 79 extending through a top wall of the flange 75. The opening 79 is aligned with the opening 77.

A face seal 81 is disposed between the body rail 40D and the flange 75 surrounding the aligned openings 77, 79. During manufacturing of the vehicle 11D, the flange 75 can be pushed upward against the face seal 81 and secured to the body rail 40D with bolts, by welding, or otherwise. Since the RBPA 12 mounts in a direction perpendicular to the face seal 81 (up and down in FIGS. 12-13), pressure can be applied to squeeze the face seal 81 between the body rail 40D and the flange 75 during the mounting process.

Figure 13:
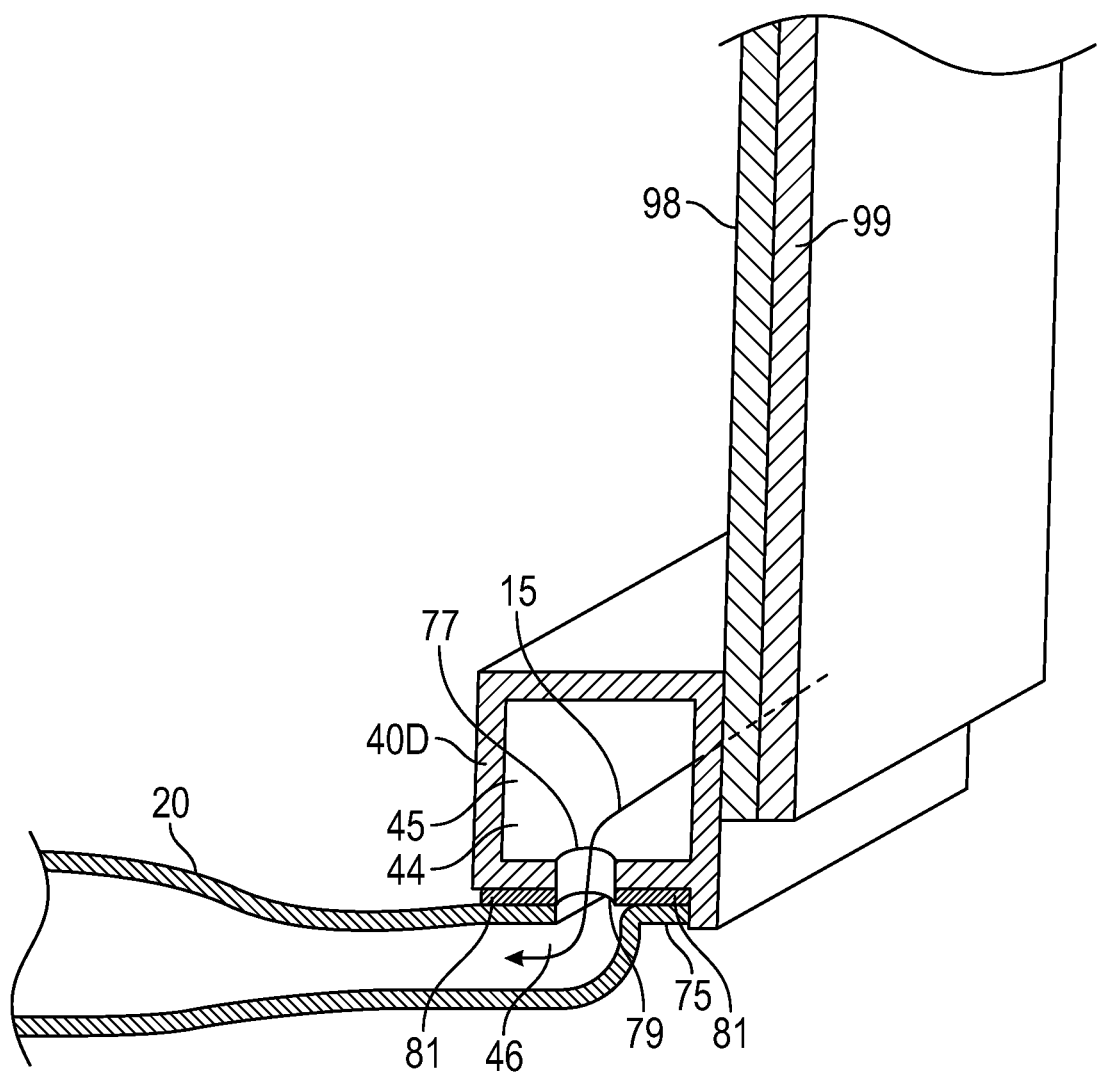
FIG. 13 is a fragmentary cross-sectional illustration of the vehicle of FIG. 12 taken at lines 13-13 in FIG. 12.

The path of the water 15 through the passage 45 of the body rail 40D is depicted as an arrow in FIG. 13. All or a portion of the conduits of the vehicles 11A, 11B, or 11C, and/or vehicle 11E described with respect to FIGS. 14-15 may be at least partially defined by a vehicle body rail. Alternatively, or in addition, other portions of the conduits may be formed by a tube, such as a flexible hose. Openings in a body rail used as the conduit in thermal management systems described herein (aside from the opening at the upstream end and at the downstream end) may be sealed and obstructions in the passage 45 may be removed or, if present, may be of a size and location such that the flow rate and pressure of the applied water 15 would still be delivered to the interior cavity 18 in a sufficient fill time.

Figure 14:
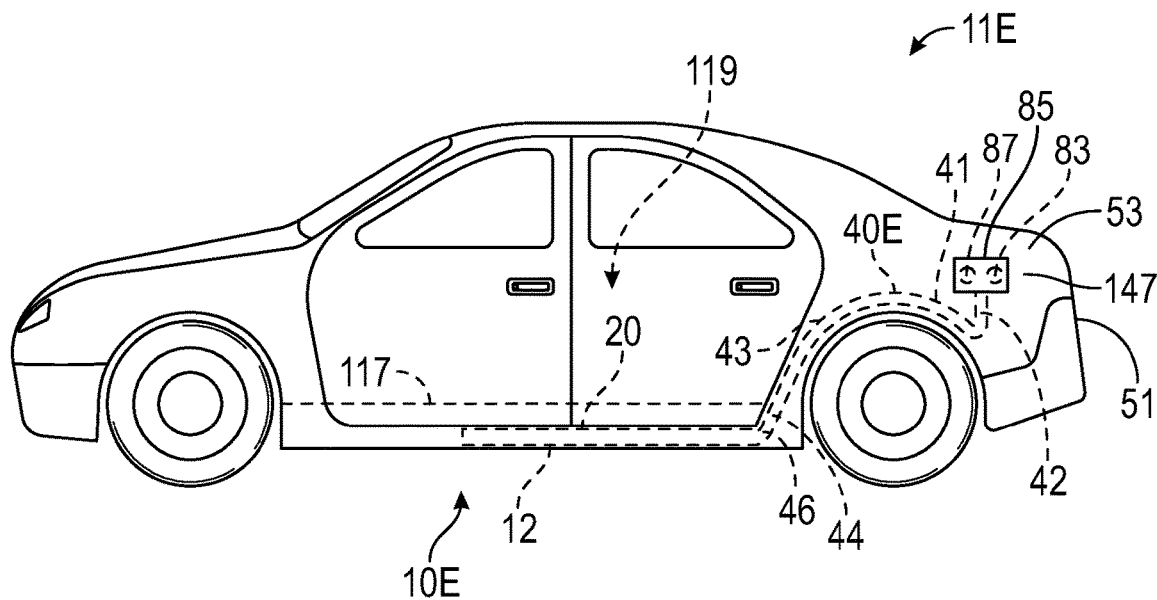
FIG. 14 is a side view illustration of a vehicle having another example of a thermal management system.

FIG. 14 shows another implementation of the thermal management system 10 and application 11 of FIG. 1 represented as a thermal management system 10E and vehicle 11E. The application is an automotive vehicle and may be referred to as such. The RBPA 12 is incorporated into the vehicle 11E for powering the vehicle 11E. For example, the RBPA 12 is shown mounted under a floor 117 of a passenger compartment 119 of the vehicle 11E. It should be appreciated, however, that the RBPA 12 could be mounted elsewhere in or on the vehicle 11E. The internal components 22 are in the interior cavity 18, as in FIG. 1, but are not depicted in FIG. 14 for simplicity in the drawing.

Figure 15:
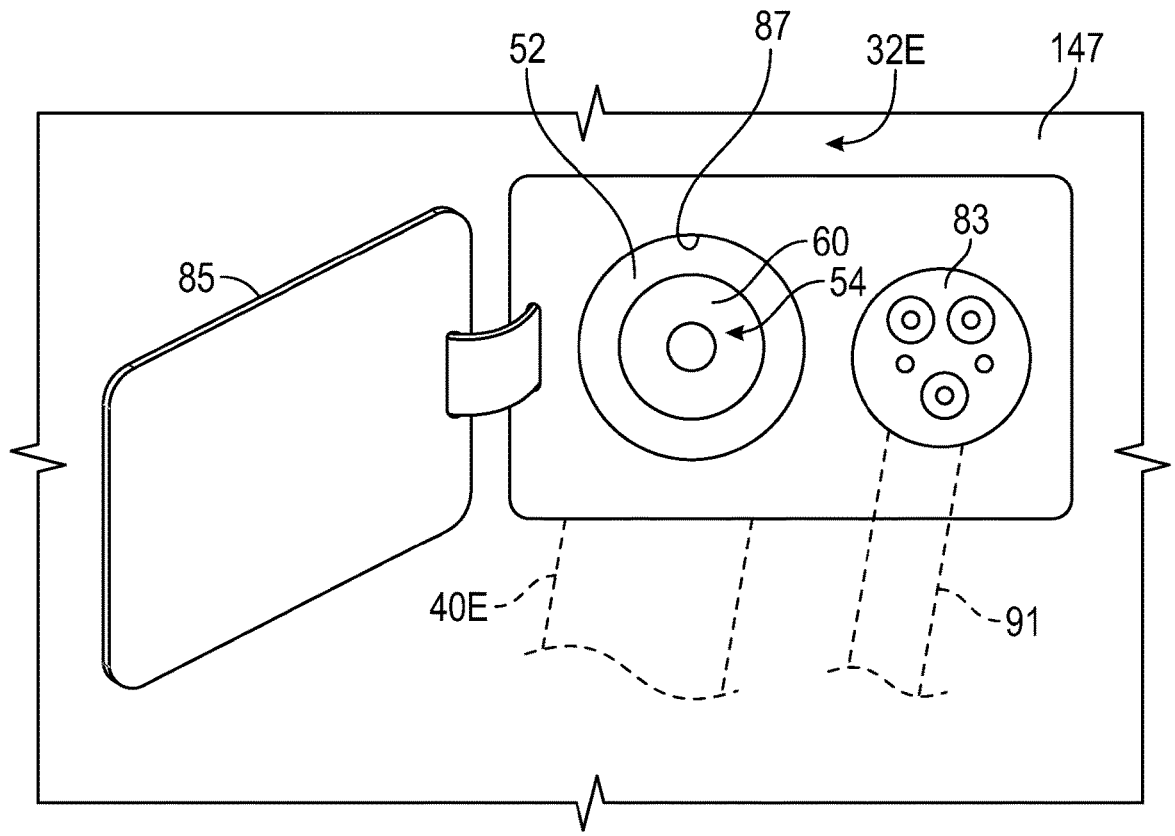
FIG. 15 is a fragmentary illustration of the vehicle of FIG. 14 showing a charge port access door open with a funnel at an inlet end of a conduit of the thermal management system of FIG. 14 disposed adjacent to a charge port.

The vehicle 11E includes a charge port 83 at the outer perimeter 32E of the vehicle 11E, as shown in FIG. 15. The charge port 83 is configured to receive an external charging device for recharging the RBPA 12. For example, the charge port 83 may be at the rear quarter panel 147 and may normally be covered by a pivotable charge port door 85 as in FIG. 14 when not charging the vehicle 11E. FIG. 15 shows the charge port door 85 pivoted to an open position to reveal the charge port 83. An access port 87 is provided through the quarter panel 147 adjacent to the charge port 83. The funnel 52 is shown at the access port 87 and a portion of the valve body 60 of the sealing mechanism 50A is visible. Alternatively, the sealing mechanism 50B may be used. The access port 87 is thus operatively connected to the upstream end 42 of the conduit 40E through the funnel 52 when the sealing mechanism 50A is in the second, open state. Electrical cables 91 extend from the charge port 83 to the RBPA 12. The conduit 40E may extend along and may be secured to the cables 91 or to other body structure in extending from the access port 87 to the port 46. The conduit 40E is configured with the inclining portion 41 and the declining portion 43 as described herein.

Figure 16:
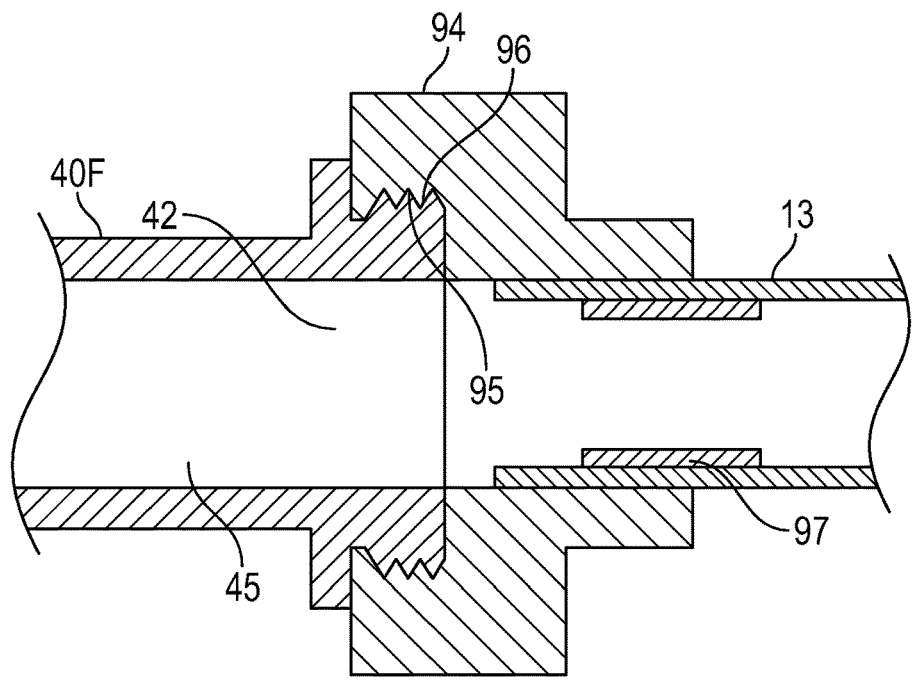
FIG. 16 is a fragmentary cross-sectional illustration of a hose coupling disposed at an upstream end of a conduit included in a thermal management system described herein.

With reference to FIG. 16, a conduit 40F may be used in place of any of the conduits 40, 40A, 40B, 40C, 40D, or 40E described herein. A hose coupling 94 secured to hose 13 is shown directly secured to the conduit 40F and disposed at the upstream end 42 of the conduit 40F. For example, the hose coupling 94 is internally threaded such that internal threads 95 of the hose coupling 94 are secured to external threads 96 of the inlet end 42 of the conduit 40F. An expansion ring 97 as well as one or more gaskets (not shown) may also be included. For example, the conduit 40F may be sized at the inlet end 42 so that the coupling 94 may be a standard, commercially available hose fitting. An operator applying water through the hose 13 would directly connect the hose 13 to the upstream end 42 at the threads 96. The sealing mechanisms 50, 50A and/or 50B discussed herein may be secured within the passage 45 at the upstream end 42 or elsewhere between the upstream end 42 and the port 46 of the enclosure 20 shown in FIG. 1, for example.

Figure 17:
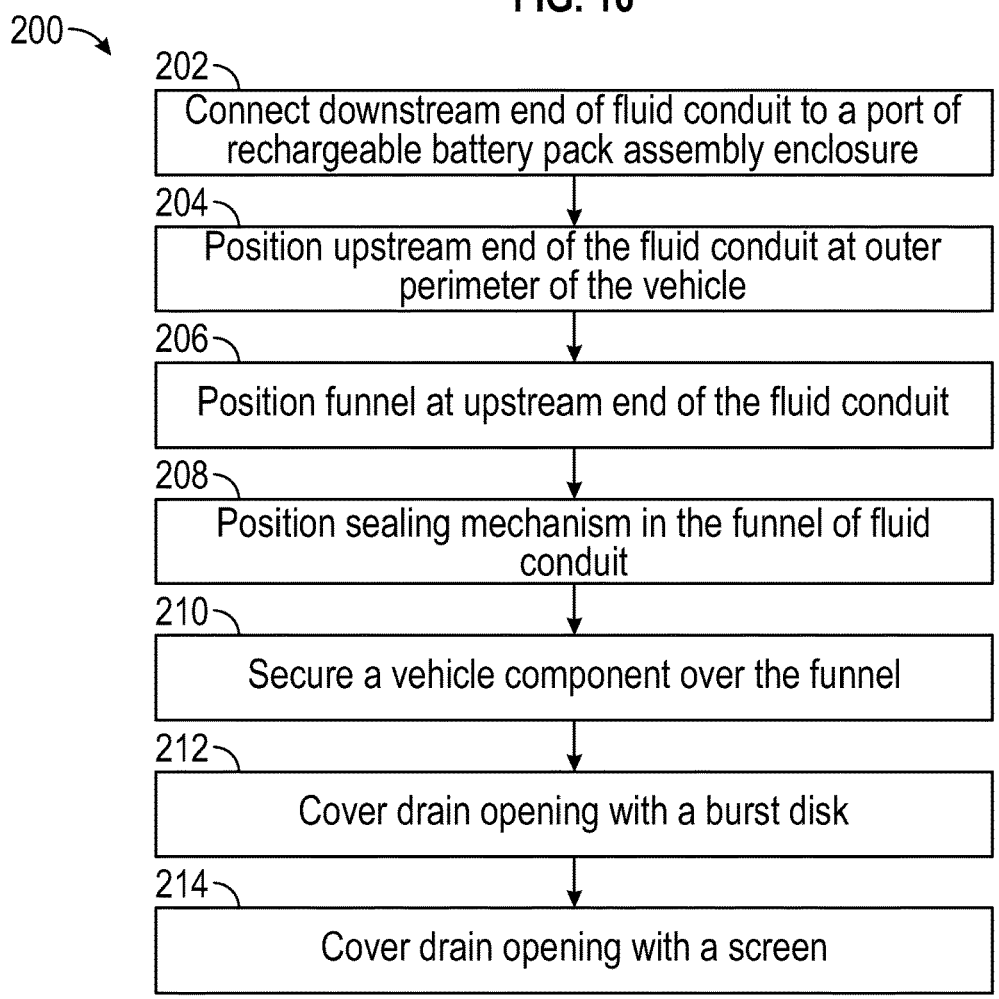
FIG. 17 is a flow diagram of a method of assembling a vehicle.

FIG. 17 is a flow diagram of a method 200 of assembling a vehicle, such as the vehicle 11A, 11B, 11C, 11D and/or 11E disclosed herein. The method 200 results in a thermal management system (such as thermal management system 10, 10A, 10B, 10C, 10D, or 10E discussed herein) that enables quenching of a normally sealed interior cavity of an enclosure of a rechargeable battery pack assembly.

The method 200 includes block 202, connecting a downstream end of a fluid conduit to a port of an enclosure of a rechargeable battery pack assembly. For example, the downstream end 44 of the fluid conduit 40, 40A, 40B, 40C, 40D, 40E, or 40F is connected to the port 46 of enclosure 20 of the RBPA 12. As discussed herein, an interior cavity 18 of the enclosure 20 may be configured to be waterproof except when water is applied through the port 46 the RBPA 12. In some examples, block 202 includes aligning an opening 79 of a flange 75 of the enclosure 20 and an opening 77 of a body rail 40D that serves as at least a portion of the fluid conduit. The aligned openings 77, 79 establish the port 46.

The method 200 further includes block 204, positioning an upstream end of the fluid conduit at an outer perimeter of the vehicle. For example, the upstream end 44 of the fluid conduit 40, 40A, 40B, 40C, 40D, 40E, or 40F is positioned at an outer perimeter 32, 32A, 32B, 32C, 32D, or 32E of the respective vehicle 11A, 11B, 11C, 11D, or 11E disclosed herein. Positioning the upstream end at the outer perimeter may include securing the fluid conduit or a portion thereof with brackets or otherwise so that the upstream end 44 is at the outer perimeter.

The method 200 may also include block 206, positioning a funnel at the upstream end 42 of the fluid conduit 40, 40A, 40B, 40C, 40D, or 40E so that the funnel is at the outer perimeter. For example, the funnel 52, 52A, or 52B may be positioned at the upstream end 42 as discussed herein.

The method 200 may further include block 208, positioning a sealing mechanism in the funnel. For example, the sealing mechanism 50, 50A, or 50B may be positioned in the funnel 52, 52A, or 52B, respectively, or the conduit 40, 40A, 40B, 40C, or 40D. It should be appreciated that block 206 and/or block 208 may occur prior to block 204 or after block 204.

After block 206 and/or block 208, the method 200 may also include block 210, securing a vehicle component over the funnel to at least partially block access to the funnel and the conduit. Non-limiting examples discussed herein include a rear bumper fascia 51, a license plate 57, a pivotable charge port door 85, or a screen or grille 65. Because quenching of the interior cavity 18 of the enclosure 20 will be implemented rarely (e.g., in case of a rare thermal runaway event), blocking access to the funnel 52, 52A, or 52B and conduit 40, 40A, 40B, 40C, or 40D helps to maintain the normally sealed, waterproof state of the interior cavity 18 of the enclosure 20.

In addition, the method 200 may include actions that enable a continuous stream of water to flow through the enclosure 20 during quenching. For example, the enclosure 20 may be provided with a drain opening 24, as discussed. The drain opening 24 may be positioned above a lower surface 29 of the enclosure 20 so that water at least partially fills the enclosure 20 before draining through the drain opening 24. In block 212, the method 200 may include covering the drain opening 24 with a rupturable membrane 26 such as a burst disk. Additionally, the method 200 may include block 214, covering the drain opening 24 with a screen 28.

Accordingly, the thermal management systems disclosed herein enable a normally sealed, waterproof interior cavity of an enclosure of a rechargeable battery back assembly to be quenched with water in order to dispel heat from the interior cavity and cool components therein. Additionally, aspects of the thermal management systems described herein enable application of water for quenching the interior cavity to be accomplished from a significant distance (e.g., remote from the outer perimeter of the vehicle or other application).

While the best modes for carrying out the disclosure have been described in detail, those familiar with the art to which this disclosure relates will recognize various alternative designs and embodiments for practicing the disclosure within the scope of the appended claims.

What is claimed is:

1. A thermal management system for a rechargeable battery pack assembly, the thermal management system comprising:
a conduit having an upstream end and a downstream end, the downstream end operatively connectable to an enclosure of the rechargeable battery pack assembly at a port of the rechargeable battery pack assembly; and
a sealing mechanism configured to transition from a first state to a second state;
wherein the sealing mechanism blocks flow of an applied stream of water through the conduit from the upstream end through the port in the first state, and the sealing mechanism permits flow of the water from the upstream end to the port in the second state and through the port into an interior cavity defined by the enclosure to cool the interior cavity; and
wherein the enclosure has a drain opening positioned so that the water is ejected from the enclosure after at least partially filling the interior cavity of the enclosure.

2. The thermal management system of claim 1, further comprising:
a funnel disposed at the upstream end of the conduit and configured to direct the applied stream of water into the conduit.

3. The thermal management system of claim 1, wherein the sealing mechanism is a spring-loaded check valve biased to the first state and that returns to the first state upon cessation of at least a predetermined pressure and/or flow rate of the applied stream of water.

4. The thermal management system of claim 1, wherein the sealing mechanism is a membrane configured to rupture under a predetermined pressure and/or flow rate of the applied stream of water.

5. The thermal management system of claim 1, further comprising:
a screen disposed at or upstream of the port of the enclosure.

6. The thermal management system of claim 1, further comprising:
a membrane disposed across the drain opening and configured to rupture when the water at least partially fills the interior cavity; and/or
a screen disposed across the drain opening.

7. The thermal management system of claim 1, further comprising:
a hose coupling disposed at the upstream end of the conduit.

8. A thermal management system for a rechargeable battery pack assembly, the thermal management system comprising:
a conduit having an upstream end and a downstream end, the downstream end operatively connectable to an enclosure of the rechargeable battery pack assembly at a port of the rechargeable battery pack assembly; and
a sealing mechanism configured to transition from a first state to a second state;
wherein the sealing mechanism blocks flow of an applied stream of water through the conduit from the upstream end through the port in the first state, and the sealing mechanism permits flow of the water from the upstream end to the port in the second state and through the port into an interior cavity defined by the enclosure to cool the interior cavity
wherein the rechargeable battery pack assembly is incorporated in a vehicle for powering the vehicle;
wherein the upstream end is at an outer perimeter of the vehicle;
wherein the conduit has an inclining portion and a declining portion;
wherein the inclining portion is between the upstream end and the declining portion; and
wherein the declining portion is between the inclining portion and the downstream end.

9. The thermal management system of claim 8, wherein:
the vehicle includes a body rail; and
the conduit is at least partially defined by the body rail.

10. The thermal management system of claim 9, wherein the port includes at least partially aligned openings of a flange of the enclosure and the body rail.

11. The thermal management system of claim 8, further comprising:
a vehicle component removably secured over the upstream end at the outer perimeter of the vehicle;
wherein the vehicle component is configured to prevent access to the upstream end when the vehicle component is secured to the vehicle, with access to the upstream end permitted when the vehicle component is removed from the vehicle.

12. The thermal management system of claim 8, further comprising:
a vehicle grille disposed over the upstream end at the outer perimeter of the vehicle and defining at least one aperture through which the applied stream of water is directed into the upstream end of the conduit.

13. The thermal management system of claim 8, wherein:
the vehicle includes a charge port at the outer perimeter of the vehicle configured to receive an external charging device for recharging the rechargeable battery pack assembly; and
the thermal management system includes an access port adjacent to the charge port and operatively connected to the upstream end of the conduit.

14. A vehicle comprising:
a vehicle body having an outer perimeter;
a rechargeable battery pack assembly disposed inward of the outer perimeter, the rechargeable battery pack assembly including an enclosure defining an interior cavity; and
a thermal management system comprising:
a conduit having an upstream end and a downstream end, the downstream end operatively connectable to the enclosure at a port of the enclosure; and a sealing mechanism configured to transition from a first state to a second state;

wherein the sealing mechanism blocks flow of water applied from a source external to the vehicle through the conduit from the upstream end through the port in the first state, and the sealing mechanism permits flow from the upstream end to the port in the second state and through the port into the interior cavity to cool the interior cavity.

15. The vehicle of claim 14, further comprising:

a vehicle component removably secured over the upstream end at the outer perimeter of the vehicle;

wherein the vehicle component is configured to prevent access to the upstream end when the vehicle component is secured to the vehicle, with access to the upstream end permitted when the vehicle component is removed from the vehicle.

16. The vehicle of claim 14, wherein:

the conduit has an inclining portion and a declining portion;

the inclining portion is between the upstream end and the declining portion; and the declining portion is between the inclining portion and the downstream end.

17. The vehicle of claim 14, wherein the sealing mechanism is a membrane configured to rupture under a predetermined pressure and/or flow rate of the water.

18. The vehicle of claim 14, wherein:

the source external to the vehicle is spaced apart from the vehicle by a distance;

the upstream end is exposed at the outer perimeter of the vehicle and is configured to receive the water from the source external to the vehicle and spaced apart from the vehicle by the distance, the water sprayed at the upstream end from the source across the distance.

19. The vehicle of claim 14, wherein the enclosure has a drain opening positioned so that the water is ejected from the enclosure after at least partially filling the interior cavity of the enclosure.

20. The vehicle of claim 14, wherein:

the vehicle includes a body rail; and the conduit is at least partially defined by the body rail.

* * * * *